INVENTORS,
KURT IKRATH &
WILHELM A. SCHNEIDER.
BY Harry M. Saragovitz
Edward J. Kelly, Herbert Berl
& Julian C. Keppler
ATTORNEYS United States Patent Office 3,524,129
Patented Aug. 11, 1970

3,524,129
DETECTION OF SUBSURFACE MINERAL DEPOSITS BY COHERENTLY DETECTING THE MODULATION PRODUCED BY A DIRECTIONAL SEISMIC BEAM
Kurt Ikrath, Elberon, and Wilhelm A. Schneider, Fair Haven, N.J., assignors to the United States of America as represented by the Secretary of the Army
Continuation of application Ser. No. 590,137, Oct. 26, 1966. This application June 19, 1969, Ser. No. 836,218
Int. Cl. G01v 11/00
U.S. Cl. 324—6   2 Claims

ABSTRACT OF THE DISCLOSURE

Underground mineral deposits are detected by scanning the subsurface with a directional seismic beam of a single frequency. Upon striking a deposit the beam will modulate the electrical or magnetic properties of the deposit and the modulation of these properties is coherently detected at the surface, to provide an indication of the presence of the deposit within the seismic beam.

---

The invention described herein may be manufactured, used, and licensed by or for the Government for governmental purposes without the payment to us of any royalty thereon.

This is a continuation of application Ser. No. 590,137, filed Oct. 26, 1966.

The present invention relates to a new and improved technique for detecting or locating underground mineral deposits. The technique involves the launching of a directional seismic wave or beam from the earth's surface. Upon striking certain subsurface mineral deposits, for example ores, the mechanical vibration of the earth caused by the seismic wave will cause changes or modulation of the electrical and/or magnetic properties of the deposits, which modulation can be detected by suitable equipment at the surface. By detecting such modulation with directional seismic waves originating at two different locations on the surface, the depth and position of the deposits is determined with accuracy as the point of intersection of the two beams. Further, coherent detection of the electric and/or magnetic modulation of the deposits using the same electric signal which produces the seismic waves as the reference signal enhances the sensitivity of the detection circuiting by discriminating against any modulation caused by natural seismic waves of different frequency from that of the directional seismic wave.

It is thus an object of the invention to provide improved methods and apparatus for detecting subsurface mineral deposits.

Another object of the invention is to provide novel techniques for detecting and locating underground mineral deposits by means of seismic-electric and seismic-magnetic interaction phenomena.

Figure 1:
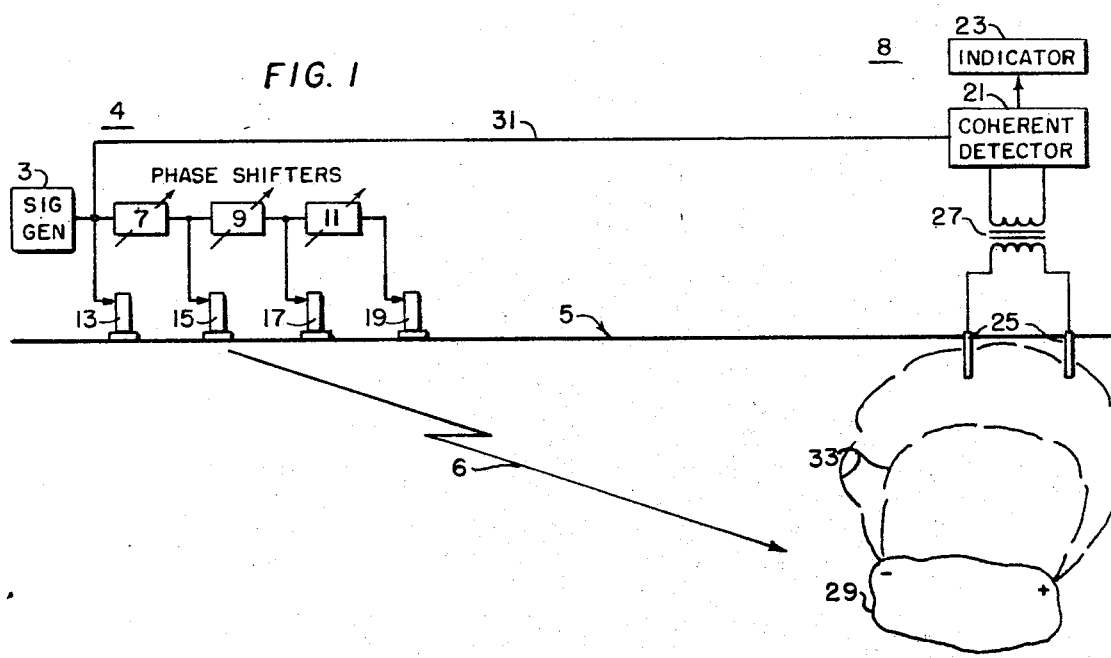
Figure 2:
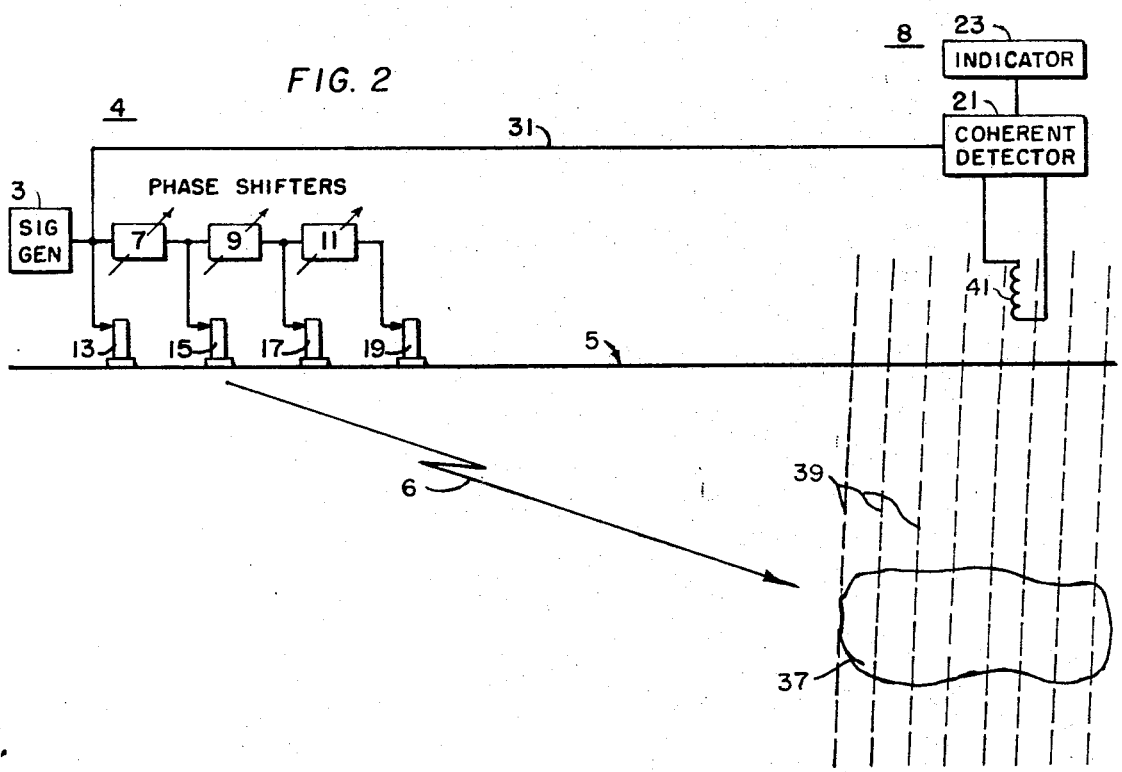

These and other objects and advantages of the invention will become apparent from the following detailed description and drawings, in which:

FIG. 1 illustrates a technique capable of detecting subsurface mineral deposits which are the sources of electrical earth currents and FIG. 2 illustrates a technique for detecting underground deposits of ferrous ores.

Referring first to FIG. 1, there is shown therein an underground mineral deposit 29 of the type which is a natural source of earth currents. Such a deposit will have regions of opposite electrical polarity as indicated by the positive and negative polarity symbols. The deposit is in effect a natural battery or galvanic cell in which the mineral or metallic ores comprising the deposit act as electrodes and natural underground water solutions of various chemicals comprise the electrolyte. The resulting galvanic voltage gives rise to natural earth currents in the vicinity of the deposit, as illustrated by the dashed lines 33. It has been found that the amplitude of these earth currents can be varied or modulated if the density of the deposit is varied, as for example by directing a seismic wave through the deposit. The exact explanation for the variation of earth current with density changes is not fully understood at present. The most plausible explanation is that the density changes in the earth caused by the alternate compression and rarefaction thereof by the seismic wave modulate both the galvanic voltage produced by the deposit and also modulate the resistivity of the surrounding portions of the earth in which the current densities are high, thus causing periodic redistribution of the current patterns at the frequency of the seismic wave. In FIG. 1 the group of elements 4 represents an illustrative means for launching a directional seismic beam or wave 6 within the earth 5, by means of which the earth may be systematically scanned to detect deposits. The seismic beam launcher 4 comprises an array of seismic transducers 13, 15, 17 and 19 resting on the earth. These transducers convert electrical signals applied thereto to seismic waves of corresponding frequency. By proper phasing of the electrical signals applied to the transducers and by proper placement of the transducers on the earth, the array will produce a seismic beam, that is most of the seismic energy will be launched in one direction, and further by continuously varying the phasing of the electrical signals to other values, the directional beam can be steered or scanned so that it will pass successively through different portions of the earth. One of the transducers, 13, is connected directly to the output of sinusoidal signal generator 3. The three variable phase shifters 7, 9, and 11 are connected in cascade to the output of the signal generator 3 with the transducers 15, 17, and 19 connected to the output of a different one of these phase shifters. Adjustment of the phase shifters provides the desired directivity and scanning motion of the seismic beam 6.

The circuitry indicated generally at 8 is an illustrative means for detecting modulation of the earth current 33 caused by the seismic beam as it encounters mineral deposit 29. This detection circuitry comprises a pair of conductive stakes or electrodes 25 driven into the earth at spaced points anywhere in the vicinity of the seismic beam launcher 4. The voltage developed by any earth currents flowing past the electrodes is applied as the signal input to coherent detector 21 via transformer 27. The other input 31 of the coherent detector is the output of the signal generator 3 which is used as a reference signal for detecting alternating current components of the earth current at the frequency of the seismic wave, which is the same as that of signal generator 3. A DC output from coherent detector 21 indicates that the earth current 33 has a component at the frequency of signal generator 3 and is strong evidence that the seismic beam is then passing through a mineral deposit of the type described. The indicator 23 registers the DC output of the detector 21. Obtaining one such reading on indicator 23 would place the underground deposit 29 along a line coinciding with the direction of the seismic beam 6. In order to pinpoint the location of the deposit the seismic beam launcher 4 may be moved to another location, for example to the right of the detector 8 of FIG. 1 and the beam again scanned until another reading is obtained on the indicator. The exact location of the deposit 29 can then be determined from the point of intersection of the two seismic beams.

By coherently detecting the earth current modulations by using a reference the same signal which produces the seismic wave, the detection circuitry discriminates against earth currents of other frequencies, including noise currents, which develop voltages between the electrodes 25.

FIG. 2 illustrates a technique for locating ferromagnetic ore deposits by modulating the magnetic properties thereof and detecting such modulation at the surface by the resultant modulation of the earth's magnetic field. The apparatus for carrying out this technique is similar in most respects to that of FIG. 1 and corresponding elements have been given the same reference characters. In this figure, the reference numeral 37 denotes a deposit of ferromagnetic ore, for example, iron ore, which may or may not be a source of galvanic earth as is the deposit 29 of FIG. 1. The seismic beam launcher 4 of FIG. 2 is the same apparatus as that of FIG. 1 and performs the same function. The detection circuitry 8 comprises coherent detector 21 and indicator 23, the reference input of the coherent detector being the output of the signal generator 3, as in the apparatus of FIG. 1. The signal input to the coherent detector comprises the voltage induced in the coil 41, which is located anywhere in the vicinity of the seismic beam launcher 4 and is oriented so that the earth's magnetic field, 39, links the turns thereof. Upon passing through the ferromagnetic deposit 37, the seismic beam 6 will alternately compress and rarefy the ore particles, thus causing a variation or modulation of the earth's magnetic field 39 in the vicinity. The coil 41 picks up these modulations of the earth's field and they are coherently detected. The direct or steady component of the earth's field will produce no voltage in the coil 41 and hence can cause no interference or inaccuracy. Also, as in FIG. 1 the coherent detector will not respond to any alternating current modulations applied thereto which differ from the frequency of the signal generator 3. As in FIG. 1, the deposit 37 may be detected from two different directions by moving the seismic beam launcher 4 to a second location after a first indication is obtained, or by means of a second seismic beam launcher spaced from the first.

What is claimed is:

1. A method of locating subsurface mineral deposits which are sources of galvanic earth current, comprising the steps of: passing from a first station at the earth's surface a first directional, sinusoidal seismic beam through said deposits to modulate the amplitude of said earth current; coherently detecting the modulation of said earth current near the surface using a signal of the same frequency as said seismic beam as a reference; passing from a second station at the earth's surface a second directional, sinusoidal seismic beam through said deposits to modulate the amplitude of said earth current; repeating said detecting step; and determining the location of said deposits from the point of intersection of the two beams.

2. The method of locating subsurface ferromagnetic mineral deposits comprising modulating the magnetic properties of said deposits with a first directional, sinusoidal seismic beam transmitted from a first station at the earth's surface, coherently detecting at the surface of the earth the modulation of the earth's magnetic field at the same frequency as that of said seismic beam, modulating the magnetic properties of said deposits with a second directional, sinusoidal seismic beam transmitted from a second station at the earth's surface, repeating said detecting step, and determining the location of said deposits from the point of intersection of the two beams.

References Cited

UNITED STATES PATENTS 3,034,594  5/1962  Menzel et al. _____ 181—.5

GERARD R. STRECKER, Primary Examiner

U.S. Cl. X.R.

181—.5